Jan. 5, 1965 W. B. DUFFY 3,164,055
SHEET-METAL NUT FORMED WITH SEALER ESCAPE PORTS
Filed July 28, 1960 2 Sheets-Sheet 1

INVENTOR
WILLIAM B. DUFFY
BY
Charles F. Chisholm
ATTORNEY

Jan. 5, 1965 W. B. DUFFY 3,164,055
SHEET-METAL NUT FORMED WITH SEALER ESCAPE PORTS
Filed July 28, 1960 2 Sheets-Sheet 2

INVENTOR
WILLIAM B. DUFFY
BY
Charles F. Chisholm
ATTORNEY

United States Patent Office 3,164,055
Patented Jan. 5, 1965

3,164,055
SHEET-METAL NUT FORMED WITH SEALER
ESCAPE PORTS
William B. Duffy, Berkeley Heights, N.J., assignor to
United-Carr Incorporated, a corporation of Delaware
Filed July 28, 1960, Ser. No. 45,928
3 Claims. (Cl. 85—32)

This invention relates to sheet-metal nuts and to nut-and-bolt assemblies made therewith. I use the term "bolt" to designate the male member, whether it be a separate member or a stud integral with one of the parts to be assembled, and whether it be initially threaded or initially threadless. While the invention may be used in many fields, the major field of present use is in automobile bodies. Automobile bodies are, of course, produced by assembly-line procedure; and the invention will be disclosed and discussed in connection with the assembly-line production of automobile bodies and the manufacture of sheet-metal nuts therefor.

Many forms of sheet-metal nuts are known, some well suited for some uses and others well suited for other uses. However, the assembly-line production of automobile bodies presents particular problems.

For automobile-body applications, as well as for many other applications, the thread engagers of high-quality sheet-metal nuts have adequate strength to develop and maintain the clamping pressure desired in the nut-and-bolt assembly. However, the thread engagers of sheet-metal nuts do not have a large amount of excess strength. To avoid overstressing of the thread engagers it is necessary that the peak tightening torque that is brought to bear on the thread engagers during the tightening of the nuts be appropriately limited. This presents little problem when sheet-metal nuts are applied with hand wrenches. However, avoidance of overstressing of the thread engagers in the assembly-line production of automobile bodies is a difficult problem because of the characteristics of the high-speed power wrenches that are used and the different types of such wrenches that are used. These power wrenches are rather rough and ready in their operation; and the nuts as manufactured should be able to withstand the variations and uncertainties in the operation of a large number of such wrenches taken collectively, including wrenches of different types and wrenches having clutches of different types.

The power wrenches used on automobile-body assembly lines have adjustable clutches, which can be set to vary the torque at which the clutches start to slip. However, the torque scale on the wrenches is frequently in increments of five or more pound-inches. This is a coarse increment of the tighten-down torques that may safely be specified for sheet-metal nuts of the sizes customarily used in automobile bodies. For a particular nut the specified tighten-down torque might be forty pound-inches, or even less.

Not only are the torque increments of the power wrenches coarse, but assembly-line workers cannot be relied upon to adjust the clutches with care. Also, the calibrations cannot be relied upon to be accurate and stable. Even with all of the wrenches on an assembly line set at forty pound-inches (per the scales on the wrenches), it can be expected that there will be a clutch somewhere in the batch of wrenches that will not slip until a substantially higher torque has been developed. Added to these practical difficulties, there is a further difficulty due to a torque which is rather imponderable.

The chucks of the power wrenches rotate at high speed, often as much as 1000 r.p.m. and sometimes as much as 1800 r.p.m. At such speeds the chuck and associated parts have a substantial fly-wheel-effect. Thus, the rotative kinetic energy of the chuck and associated parts continue to drive the nut after the clutch has started to slip. This imposes a still higher peak torque on the nut, even though momentarily. The magnitude of such peak torque will depend not only upon the rotative kinetic energy of the chuck and associated parts but also upon both the type of clutch and how far the nut advances after the clutch has started to slip. In some instances the further advance of the nut may be so slight as to result in a very substantial increase in the peak torque imposed on the nut.

In U.S. patent, Hotchkin, 2,734,547, issued February 14, 1956, there is disclosed a sheet-metal nut having a rim which, as the nut is tightened down, provides increasing braking action that absorbs some of the torque developed by a power wrench and thereby provides protection against the stripping of the thread engager. The nut of this patent, which is widely used, will be referred to hereinafter.

At some locations in some body-parts the hole or holes through which the bolt is to pass are only slightly larger than the bolt. However, at some locations in certain classes of body-parts there is difficulty in aligning the bolt with the hole that is to receive the bolt or difficulty in aligning two holes which are to receive a single bolt. Therefore, the holes are customarily made much larger than the bolt, so that the bolt can be inserted conveniently. The use of different nuts, one where the bolt hole is but little larger than the bolt and another where the bolt hole is much larger than the bolt, creates inventory problems and other problems. In U.S. patent, Hotchkin, 2,734,547, the nut has a washerlike base of a size sufficient to cover a bolt hole of any reasonable range of sizes, from a hole but little larger than the bolt to one much larger than the bolt.

In many, but not all, automobile-body applications a sealer is used in conjunction with the sheet-metal nut to make a watertight seal at the location where the bolt passes through the body-part or parts. The use of different forms of nuts, one when sealers are to be used and another when sealers are not to be used, creates inventory problems and manufacturing problems. To manufacture the two forms of nuts it is necessary to have two sets of production tools and to make production runs with both sets. These difficulties are overcome if the same nut is well adapted for use both with and without sealers. Nuts which have been used without sealers and also with certain types of sealers are the nut of U.S. patent, Hotchkin, 2,734,547, and the United-Carr nut illustrated and described on page 141 of Automotive Industries, October 15, 1956. The United-Carr nut is also disclosed in U.S. patent, Becker, 2,969,705, issued January 31, 1961. However, these nuts have undesirable limitations as regards the nature of the sealers.

Among the sealers that have been used are polyethylene sealers that are in the nature of load-sustaining washers which are sufficiently yieldable to compensate for surface irregularities in the body-part that is to be engaged by the nut. These have been used to advantage with the United-Carr nut aforesaid.

More yieldable sealers have been made of polyvinyl chlorides. To increase their range of deformation they have sometimes been "puffed," i.e. made with a multitude of internal voids. Both unpuffed and puffed polyvinyl chloride sealers have been used to advantage with the nut of U. S. patent, Hotchkin, 2,734,547. However, polyvinyl chloride sealers, as well as polyethylene sealers, leave much to be desired when used for certain automobile-body applications.

While polyvinyl chloride sealers may be so made as to be highly deformable, the ones that have been used, and to which I have referred, are not puttylike and do not truly flow under pressure. At the same time the resiliency of such polyvinyl chloride sealers is so small that they are not sufficiently load-sustaining to render it unnecessary to bring the nut into metal-to-metal contact with the part that is to be clamped by the nut. Therefore, the volume of such a polyvinyl chloride sealer must be limited to an amount which will permit the nut to be tightened into metal-to-metal contact with the clamped part even when the bolt nearly fills the hole in the body-part or parts through which it passes. As a result of such limitation of the volume of the sealer, it is often unable to fill the space around the bolt in those instances in which the space is quite large.

Another difficulty with polyvinyl chloride sealers is that the material is not particularly resistant to tearing and shredding. The bolt holes in automobile-body-parts are punched, leaving a burr around the margin of the hole. The sealer is customarily pre-attached to the nut and, as the nut is tightened down toward a burr, the burr tends to tear and shred a polyvinyl chloride sealer.

A further problem in certain automobile-body applications is the making of a good, and durable, electrical connection between the nut and the body-part is clamped thereby. An example is when the nut is used in the mounting of a taillight assembly in which the nut is to make "grounding" connection to the body and thereby complete a circuit to the taillight.

Because of the limitations of polyethylene sealers and polyvinyl chloride sealers, as have been explained, mastic sealers are used in certain automobile-body applications—especially where there is large and/or irregular space around the bolt. Mastic sealers are tacky and puttylike. While they do not flow readily, they flow under pressure and are not load-sustaining. They can be molded into irregular space around the bolt and into the space within the nut. Since they are not load-sustaining the nut must be brought into metal-to-metal contact with the clamped part in order to produce a tight nut-and-bolt assembly.

As has already been explained, the space around the bolts in automobile-body assemblies varies widely. Thus the volume of mastic in a mastic sealer—usually pre-attached to the bottom of the nut—must be sufficient to fill the largest space that will ordinarily be encountered. This means that when there is a small space around the bolt a large quantity of the mastic will have to be expelled in order to tighten the nut completely down and bring it into metal-to-metal contact with the adjacent body-part; also the mastic will have to be evenly expelled, circumferentially, in order to produce a good and lasting seal. Where the nut is tightened with a hand wrench a large quantity of mastic can be satisfactorily expelled when using the nut of U.S. patent, Hotchkin, 2,734,547. It is otherwise, however, when a high-speed power wrench is used.

With a power wrench operating at high speed the nut is tightened down so quickly that, with the aforesaid Hotchkin nut, there is often insufficient time for the last of the excess mastic to flow from beneath the nut. Thus the chuck of the wrench will be stopped through torque built up as a result of the inability of the mastic to flow rapidly enough as the nut approaches metal-to-metal contact with the body-part that is to be clampingly engaged by the nut. As a result the nut itself is likely to be left propped up temporarily by the mastic which, being flowable under pressure, will cause the assembly to quickly loosen.

It has been proposed to modify the washerlike base of U.S. patent, Hotchkin, 2,734,547, to permit the necessary amount of excess mastic to be expelled when the nut is applied with a high-speed power wrench. However, the modifications of the washerlike base that have been proposed would unduly increase the cost of the nut and/or impair it as regards use of the nut without a sealer. As has been mentioned, sealers are used in connection with only some of the sheet-metal nuts used in automobile bodies and resorting to two forms of nuts, one for use with sealers and one for use without sealers, creates inventory problems and manufacturing problems.

An object of the present invention is to provide a sheet-metal nut and an assembly in which the nut has a washerlike base that, when the nut is used with a mastic sealer, provides for satisfactory elimination of excess mastic when the nut is applied with a high-speed power wrench and which nut is, nevertheless, well suited for use without a sealer.

Another object of the invention is to provide such a nut, and such an assembly, which can be rapidly and inexpensively made.

Further objects of the invention are to provide such a nut which is well adapted for low-cost manufacture on a quantity-production basis, and to provide such a nut which is also well suited for use with load-sustaining and non-load-sustaining compressible sealers, as well as with mastic sealers.

Additional objects are to provide a sheet-metal nut and assembly which achieves the foregoing objects and in which the nut, in addition, makes good electrical connection between the bolt and a body-part engaged by the nut, even in the face of a painted surface on the body-part; to provide a sheet-metal nut and assembly in which the nut makes electrical connection in an improved manner with a conducting member that is clamped by the nut; and to provide such a nut and assembly which permits the use of a suitable sealer without interfering with the electrical connection.

Other objects and advantages will be apparent from the drawings and from the description and discussion in connection therewith.

For clarity and convenience the assembly and the nut will be referred to, in both the specification and the claims, on the basis of the bolt being vertical, the nut advancing downwardly on the bolt as the nut is applied, and the portion of the nut which is toward the upper end of the bolt being the top of the nut. However, no limitation as to the positioning of the assembly is to be implied, since it will be understood that the assembly may be placed with the assembled nut and bolt in any oriented position.

In both the description and the claims, parts at times may be identified by specific names for clarity and convenience, but such nomenclature is to be understood as having the broadest meaning consistent with the context and with the concept of my invention as distinguished from the pertinent prior art. The best modes in which I have thus far contemplated carrying out my invention are illustrated in the drawings, forming part of this specification, in which:

In the original drawing filed in the Patent Office all of FIGS. 1–14 are on enlarged scales, the scale of some figures being larger than the scale of others.

Figure 1:
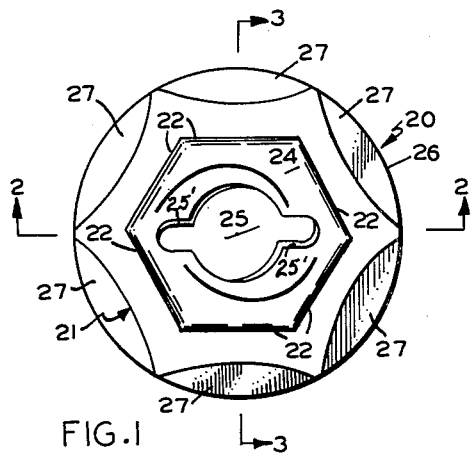
FIG. 1 is a top plan view of one form of nut embodying the invention.
Figure 3:
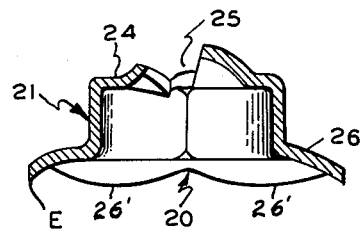
FIG. 3 is a section on the line 3—3 of FIG. 1.
Figure 2:
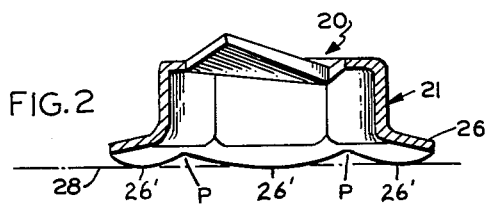
FIG. 2 is a section on the line 2—2 of FIG. 1.
Figure 4:
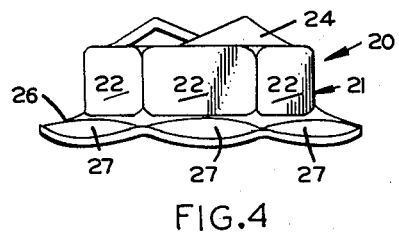
FIG. 4 is an elevation of the nut shown in FIG. 1, looking from the bottom of FIG. 1.
Figure 5:
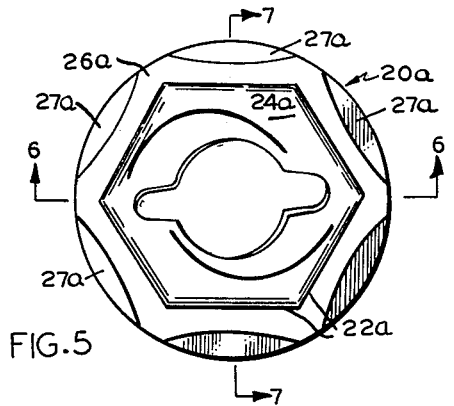
FIG. 5 is a top plan view of a second nut embodying the invention.

Reference will first be had to FIGS. 1–4 and 9. The nut 20 is in one piece and seamless throughout. It has an upstanding hexagonal shell 21 that provides six wrench faces 22. Extending across the top of the shell is a web 24 that has a central hole 25 and radial notches 25′, 25′, the metal around the hole being formed to make threaded engagement with a bolt. An annular washerlike base 26 extends outwardly from the bottom of the shell 21, being downwardly inclined somewhat as seen in FIGS. 2, 3 and 4.

The axis of the nut is at the center of hole 25 and, in FIG. 1, is a line extending perpendicularly into the paper at the center of hole 25. As viewed in FIG. 1 the peripheral edge of the washerlike base 26 is circular; and the nut axis passes through the center of such circle. As viewed in FIGS. 2, 3 and 4, the peripheral edge of the washerlike base 26 is scalloped; and the nut axis extends perpendicularly to the plane 28 (FIG. 2) in which the lowermost portions of the scallops lie. When the nut is applied to a bolt the nut axis coincides with the axis of the bolt in the absence of cocking of the nut on the bolt.

I form the washerlike base 26 with six downwardly-inclined facets or flats 27; and I place each facet opposite one of the wrench faces, in which position each facet and the adjacent wrench face will be centrally bisected by a single radial plane which includes the nut axis. I place the facets at an angle of approximately 30 degrees to the horizontal which, in a solid geometry sense, means that at the aforesaid bisecting radial plane the facet makes an angle of approximately 30 degrees with the horizontal.

Figure 9:
FIG. 9 is a fragmentary plane development of the peripheral edge of the washerlike base of the nut shown in FIGS. 1–4, looking perpendicularly toward the axis of the nut.

In the nut of FIGS. 1–4 the six facets 27, which are alike and disposed in like manner, closely approach one another circumferentially as shown in FIG. 1. Throughout the circumferential extent of each facet 27 the peripheral edge of the washerlike base 26 is downwardly arched as viewed perpendicularly to the nut axis. Thus the peripheral edge of the washerlike base 26 is vertically scalloped, having six scallops 26′ some of which are seen in FIGS. 2 and 4. The scalloped formation provides a port P (to be referred to later) opposite each corner of the hexagonal shell 21. If the circumferential edge of the washerlike base be viewed perpendicularly to the nut axis and, as so viewed, the edge be developed into a plane, it will appear as shown in FIG. 9 which is a fragmentary view showing four of the six scallops 26′. This circumferential edge has a shearing burr E (FIGS. 3 and 4), which will be referred to later.

The metal around the hole 25 may be given any shape or formation suitable for making threaded engagement with a bolt. For engagement with a threaded bolt the metal around the hole may be conventionally formed and may be formed for self-locking engagement with the bolt if desired; see for example the thread engagers in U.S. patent, Hotchkin, 2,734,547. The metal around the hole 25 may also be so formed as to make its own thread on an initially-threadless bolt; see for example (a) the thread-making female thread-form in the United-Carr nut illustrated and described on page 141 of Automotive Industries, October 15, 1956, and also disclosed in U.S. patent, Becker, 2,969,705, and (b) the thread-making female thread-forms disclosed in Duffy et al., U.S. application Ser. No. 696,988, filed November 18, 1957, for Self-Threading Construction, now U.S. Patent 2,980,059.

Using sheet spring-steel .018″ thick I have made commercial nuts of FIGS. 1–4 with a thread-making web 24, which commercial nuts were in the size for an initially-threadless metal-bolt of $\frac{5}{16}$″ nominal diameter. In such nuts the opposite wrench faces 22 were $\frac{3}{8}$″ apart, the outside diameter of the washerlike base 26 as viewed in FIG. 1 was $\frac{5}{8}$″, the radius of curvature between the bottom of the hexagonal shell 21 and the washerlike base 26 was approximately .03″, the downward inclination of the washerlike base 26 as seen in FIG. 2 was approximately 10 degrees, the facets 27 were at an angle of approximately 30 degrees to the horizontal, and adjacent facets were spaced from each other by approximately .01″ as measured on the bottom of the washerlike base.

The nut shown in FIGS. 5–8 has a different washerlike base from the nut shown in FIGS. 1–4. Except for the different washerlike base, and except for dimensional data for the particular size nut referred to in connection with FIGS. 1–4, the description and discussion in connection with FIGS. 1–4 apply to FIGS. 5–8 also.

Figure 6:
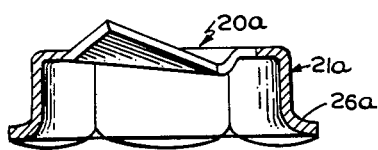
FIG. 6 is a section on the line 6—6 of FIG. 5.

In FIGS. 5–8 the annular washerlike base 26a as seen in FIG. 6 is substantially perpendicular to the nut axis and is narrower (radially considered) than the base 26 in FIGS. 1–4. The facets 27a do not approach each other as closely as the facets 27 in FIGS. 1–4.

Using sheet spring-steel .021″ thick I have made commercial nuts of FIGS. 5–8 with a thread-making web 24a, which commercial nuts were in the size for an initially-threadless metal-bolt having a nominal diameter of $\frac{1}{4}$″. In such nuts the opposite wrench faces 22a were $\frac{7}{16}$″ apart, the outside diameter of the washerlike base 26a as viewed in FIG. 5 was $\frac{19}{32}$″, the radius of curvature between the bottom of the hexagonal shell 21a and the washerlike base 26a was approximately .03″, the facets 27a were at an angle of approximately 30 degrees to the horizontal and adjacent facets were spaced from each other by approximately .04″ as measured on the bottom of the washerlike base.

Figure 10:
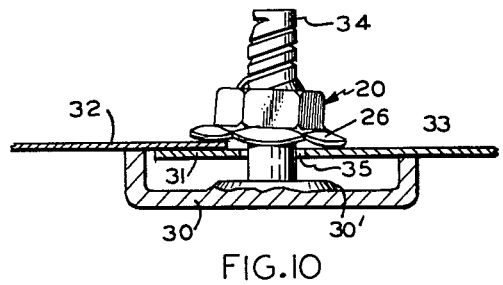
FIG. 10 is a view partially in section and partially in elevation showing an assembly utilizing the present invention.

In FIG. 10 trim 30, which may be either die-cast or rolled, is used to mask a lap weld at 31 between automobile-body sheets 32 and 33. Operatively integral with the trim 30 at an integral boss 30′ thereof is an initially-threadless bolt, in the form of a stud 34, which passes through hole 35. Nut 20, which is the nut of FIGS. 1–4, is threaded onto the bolt and makes clamping engagement with the welded sheets 32, 33. While the nut is being tightened down with a power wrench the scallops at the periphery of the washerlike base 26 readily ride over the edge of plate 32 and permit tight application of the nut, the same as though the nut had a washerlike base as in U.S. patent, Hotchkin, 2,734,547.

Figure 11:
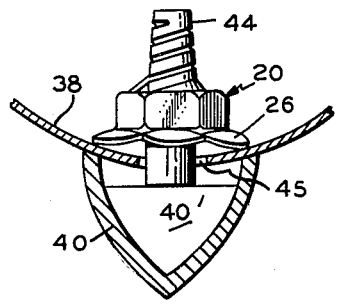
FIG. 11 is a view partially in elevation and partially in section showing another assembly utilizing the invention.
Figure 12:
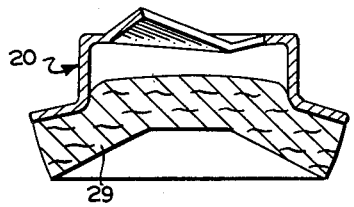
FIG. 12 is a sectional view corresponding to FIG. 2, showing a mastic sealer in conjunction with the nut.
Figure 13:
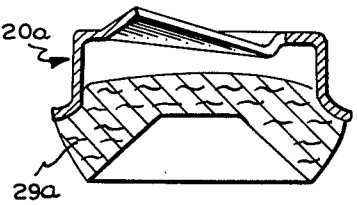
FIG. 13 is a sectional view corresponding to FIG. 6, showing a mastic sealer in conjunction with the nut.

In FIG. 11 trim 40, which may be either die-cast or rolled, is located at an arched portion of an automobile-body sheet 38. Operatively integral with the trim 40 at an integral boss 40′ thereof is an initially-threadless bolt 44 which passes through a hole 45. The nut 20 is the same as in FIG. 10, and also the same as in FIGS. 1–4. The scallops at the periphery of the washerlike base 26 ride over the troughlike contour of the sheet 38 and permit tight application of the nut, the same as though the nut had a washerlike base as in U.S. patent, Hotchkin, 2,734,547.

Where a sealer is desired it may be pre-attached to the bottom of the nut. FIG. 12 shows an illustrative mastic sealer 29 pre-attached to the nut 20 of FIGS. 1–4, and FIG. 13 shows an illustrative mastic sealer 29a pre-attached to the nut 20a of FIGS. 5–8. Any suitable mastic may be used, various suitable mastics being commercially available. For the sealer I have used a mastic sold by Presstite Division of American-Marietta Corp. and identified by it as Presstite Mastic, #169 Compound. Also I have used a mastic sold by Form Seals Corp. and identified by it as Mastic #1 Compound. Both of these mastics are covered by current Fisher Body specification #23-1.

The sealer, whether mastic or of other character, may be pre-attached to the nut in any suitable manner, procedures for attaching the sealers being known. With a mastic sealer I have adhesively attached it to the bottom of the nut, using heat and pressing the sealer into the nut. In addition to the bond formed by the adhesive, the pressing of the mastic into the hexagonal shell provides a measure of mechanical grip between the nut and the mastic sealer.

Opposite each corner of the hexagonal shell 21 the washerlike base 26 has an escape port P (FIG. 2) through which the last portion of the excess mastic is expelled as the nut is tightened down into firm metal-to-metal contact with the body-part that is to be clampingly engaged by the nut. Since these escape ports are of equal size and are equally distributed circumferentially, the last portion of the excess mastic is expelled in substantially equal amounts at locations which are equally spaced about the circumference.

Figure 14:
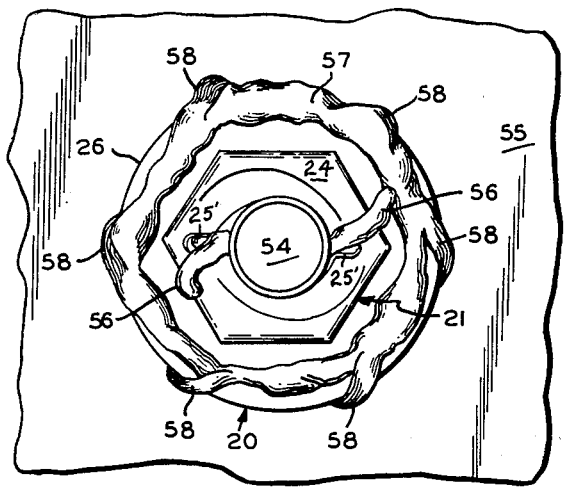
FIG. 14 is a top plan view showing an assembly made with the nut and mastic sealer of FIG. 12, the nut itself being the same as the nut in FIG. 1.

FIG. 14 shows an actual assembly in which the nut 20 of FIGS. 1-4, previously provided with mastic 29 as in FIG. 12, has been screwed down with a high-speed power wrench. In FIG. 14 a bolt, in the form of initially-threadless stud 54, passes through a body-sheet or plate 55; and the nut 20 has been screwed down onto the bolt and brought into firm engagement with the plate 55. As the nut was being screwed down, the mastic was forced into the voids around the bolt 54 including the empty space within the nut 20 itself. A small amount of excess mastic was expelled through the two radially-extending notches 25', 25' in the web 24 at the top of the nut (see also FIG. 1), forming two strands of mastic 56, 56 which remain homogeneously connected to the body of the mastic within the shell 21.

Except for the small amount of mastic expelled through the top of the nut, the excess mastic was expelled from beneath the washerlike base 26 of the nut—as the base approached the plate 55 and was then brought into firm engagement with the plate 55, the edges of the scallops 26' yielding somewhat whereby much of each scallop was brought substantially into contact with the plate 55. With a power wrench operating at a speed such as 1000 r.p.m. the mastic is expelled so rapidly that the instantaneous disposition of the expelled mastic is not visible. In the completed nut-and-bolt assembly, however, the expelled mastic is disposed in the general fashion shown in FIG. 14.

As the washerlike base 26 approaches the plate 55 without yet being in contact with the plate, the mastic is squeezed out in a circumferentially-continuous band that, throughout the circumference, is homogeneous with the layer of mastic beneath the base 26. Due to the slow-flow characteristics of the mastic the expelled mastic cannot relieve itself of circumferential strain with sufficient rapidity to prevent the expelled ring of mastic from contracting. Through contraction the circumferential ring 57 of expelled mastic moves to a position on top of the washerlike base as shown in FIG. 14. As the scallops 21' (FIG. 2) come into contact with the plate 55 they circumferentially shear the expelled ring of mastic from the layer of mastic that remains beneath the washerlike base 21. At the same time, and as the scallops 26' yield somewhat and the washerlike base 21 advances into firm engagement with the plate 55, the last portion of the excess mastic is expelled through the six escape ports P (FIG. 2). This last portion of the excess mastic is formed into six strands 58, one end of each strand being homogeneous with the ring of mastic 57 on top of the washerlike base 21 and the other end of each strand being homogeneous with the layer of mastic that remains beneath the washerlike base.

While the mastic leaves the escape ports P tangentially to the rear, the strands 58 do not proceed tangentially. Since the leading ends of the strands are attached to the contracting ring 57, the strands are pulled up and over the edge of the washerlike base 26, being often looped forwardly to some extent.

The amount of expelled mastic varies from assembly to assembly. Also, the mastic is expelled at different speeds, depending upon the speed of the wrench. Thus the geometrical pattern of the expelled mastic varies somewhat from assembly to assembly. However, in a typical nut-and-bolt assembly the pattern of the expelled mastic has the characteristics shown in FIG. 14, viz., a ring 57 of mastic which lies on top of the washerlike base 21 and which is homogeneously connected by six strands 58 to the layer of mastic that is beneath the washerlike base.

When a mastic sealer is used with the nut of the aforesaid U.S. patent, Hotchkin, 2,734,547, a ring of mastic is expelled from beneath the washerlike base and completely severed from the mastic beneath the base. These rings of mastic then fall away and, unless picked up and removed, constitute a source of nuisance. I obviate this source of nuisance by holding the ring of expelled mastic captive to the nut-and-bolt assembly. I may do this with nuts and nut-and-bolt assemblies other than the preferred ones disclosed.

When the nut is rapidly tightened down with a power wrench the faceted washerlike base circumferentially contains the mastic while at the same time permitting the excess mastic to be expelled not only with sufficient rapidity but also with sufficient completeness. The six downwardly-inclined facets or flats 27, taken collectively, extend entirely around the mastic sealer. The six equally-spaced escape ports P, taken collectively, provide for adequate and uniformly-distributed discharge of the last portion of the excess mastic as the nut is rapidly tightened down with a power wrench, thereby obviating slipping of the clutch of the wrench before firm metal-to-metal contact has been established between the washerlike base 26 and the part that is to be clampingly engaged thereby.

Further, the downwardly-inclined facets hold the washerlike base as a whole in spaced relation to the element that is clampingly engaged, thereby insuring that beneath the washerlike base there will be a layer of mastic of sufficient thickness to make and maintain a good seal.

Figure 7:
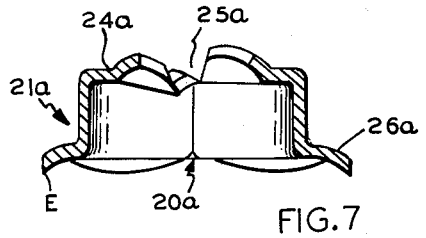
FIG. 7 is a section on the line 7—7 of FIG. 5.
Figure 8:
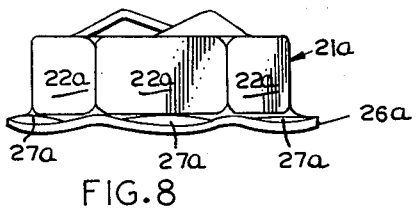
FIG. 8 is an elevation of the nut shown in FIG. 5, looking from the bottom of FIG. 5.

In punching out the nut I direct the peripheral shearing burr downwardly and form a circular cutting edge coaxial with the nut axis, as shown at E in FIGS. 3 and 7. As the nut is tightened down this cutting edge, which projects downwardly from the periphery of the washerlike base 26 of the nut and is interrupted at ports P, not only cuts through the mastic that is being expelled but also cuts a circular line through the paint on the body-part that is being clampingly engaged, thereby establishing good electric contact between the nut and body-part.

Since the nut is threaded onto the bolt there is no problem about good electrical connection between the nut and the bolt, particularly where the nut forms its own thread on the bolt. The nut of the present invention automatically provides good and durable electric connection between the nut and the automobile-body-part that is clampingly engaged by the nut, thereby providing a "grounding" connection from the bolt to the automobile body where such is needed to complete a circuit.

The present invention provides a single form of nut which is well suited for making assemblies without a sealer, well suited for making assemblies with a load-sustaining sealer, well suited for making assemblies with a highly compressible non-load-sustaining sealer, and well suited for making assemblies with a mastic sealer.

When used without a sealer, and also when used with a mastic or other non-load-sustaining sealer, the nut automatically provides a good electrical connection from the bolt to the part that is clampingly engaged by the nut even if the engaged part be a painted one. Thus, with one inventory of the nuts themselves, and one set of production tools for manufacturing the nuts, nut-and-bolt assemblies of these numerous classes are provided for.

Not only is the nut of the present invention well suited for application with a high-speed power wrench whether or not a sealer is used but, when a mastic sealer is used, the nut provides adequate discharge ports for the last of the excess mastic without weakening the washerlike base and without formations which would interfere with the washerlike base riding over irregularities such as, for example, the irregularities illustrated in FIGS. 10 and 11.

For nuts having thread engagers of the types hereinbefore referred to I form the nuts from annealed spring-steel and harden and temper them after forming. For nuts having thread engagers, or thread forms, which are sufficiently strong when made of softer metal I contemplate doing the same and, in the alternative, contemplate forming the nuts from mild steel and also nonferrous metals. If the nuts be stamped from sheet metal the stamping operation will impart springiness to the metal, though not the degree of springiness that can be obtained by hardening and tempering spring-steel.

I claim:

1. In a one-piece sheet-metal nut in which (a) an upstanding shell provides a circumferentially-disposed series of wrench faces, (b) a web extends inwardly from the top of the shell, (c) the web has a central hole, (d) the metal around the hole is formed to make threaded engagement with a bolt, (e) an annular washer-like base extends outwardly and downwardly from the bottom of the shell, (f) the outer edge of the washerlike base is substantially circular and undulates axially of the nut, and (g) a circumferentially-disposed series of facets are formed on the washerlike base, one facet opposite each of said wrench faces; the improvement which comprises:
   (I) each facet being a downwardly-bent local-portion of the washerlike base and being radially spaced from the wrench face with which it is aligned,
   (II) the wrench-face-confronting boundary of each facet being an arc the convexity of which is toward the wrench face and the ends of which are at spaced points on the outer edge of the washerlike base,
   (III) the outer edge of the washerlike base drooping downwardly between said spaced points and defining the opposite boundary of the facet,
   (IV) the center of each said arc being opposite, and radially spaced from, the center of the wrench face with which the facet is aligned,
   (V) the lowermost portions of the downwardly-drooping configurations at the outer edge of the washerlike base lying substantially in a common plane that is substantially perpendicular to the nut axis,
   (VI) the top surface of the washerlike base being smooth and continuous, broken only by said facets, said facets taken collectively occupying at least the major portion of the outer edge of the washerlike base,
   (VII) and the top surface of the washerlike base including a smooth and continuous annular zone completely surrounding the shell of the nut and extending from the shell to the facets, the surface of said zone being at an unchanging level as said zone is traversed circumferentially of the nut.

2. In a one-piece sheet-metal nut in which (a) an upstanding hexagonal shell provides six wrench faces, (b) a web extends inwardly from the top of the shell, (c) the web has a central hole, (d) the metal around the hole is formed to make threaded engagement with a bolt, (e) an annular washerlike base extends outwardly and downwardly from the bottom of the shell, (f) the outer edge of the washerlike base is substantially circular and undulates axially of the nut, and (g) six facets are formed on the washerlike base, one facet opposite each of said wrench faces; the improvement which comprises:
   (I) each facet being a downwardly-bent local-portion of the washerlike base and being radially spaced from the wrench face with which it is aligned,
   (II) the wrench-face-confronting boundary of each facet being an arc the convexity of which is toward the wrench face and the ends of which are at spaced points on the outer edge of the washerlike base,
   (III) the outer edge of the washerlike base drooping downwardly between said spaced points and defining the opposite boundary of the facet,
   (IV) the center of each said arc being opposite, and radially spaced from, the center of the wrench face with which the facet is aligned,
   (V) the lowermost portions of the downwardly-drooping configurations at the outer edge of the washerlike base lying substantially in a common plane that is substantially perpendicular to the nut axis,
   (VI) the top surface of the washerlike base being smooth and continuous, broken only by said facets, said facets taken collectively occupying at least the major portion of the outer edge of the washerlike base,
   (VII) and the top surface of the washerlike base including a smooth and continuous annular zone completely surrounding the shell of the nut and extending from the shell to the facets, the surface of said zone being at an unchanging level as said zone is traversed circumferentially of the nut, and said zone extending to the circular outer-edge of the base at locations that are opposite the corners of the shell.

3. In a one-piece sheet-metal nut in which (a) an upstanding hexagonal shell provides six wrench faces, (b) a web extends inwardly from the top of the shell, (c) the web has a central hole, (d) the metal around the hole is formed to make threaded engagement with a bolt, (e) an annular washerlike base extends outwardly and downwardly from the bottom of the shell, (f) the outer edge of the washerlike base is substantially circular and undulates axially of the nut, (g) six facets are formed on the washerlike base, one facet opposite each of said wrench faces, and (h) each facet extends inwardly from the circular outer-edge of the washerlike base; the improvement which comprises:
   (I) each facet being a downwardly-bent local-portion of the washerlike base and being radially spaced from the wrench face with which it is aligned,
   (II) the wrench-face-confronting boundary of each facet being an arc the convexity of which is toward the wrench face and the ends of which are at spaced points on the outer edge of the washerlike base,
   (III) the outer edge of the washerlike base drooping downwardly between said spaced points and defining the opposite boundary of the facet,
   (IV) the center of each said arc being opposite, and radially spaced from, the center of the wrench face with which the facet is aligned,
   (V) the lowermost portions of the downwardly-drooping configurations at the outer edge of the washerlike base lying substantially in a common plane that is substantially perpendicular to the nut axis,
   (VI) the top surface of the washerlike base being smooth and continuous, broken only by said facets, said facets taken collectively occupying at least the major portion of the outer edge of the washerlike base,
   (VII) the top surface of the washerlike base including a smooth and continuous annular zone completely surrounding the shell of the nut and extending from the shell to the facets, the surface of said zone being at an unchanging level as said zone is traversed circumferentially of the nut,
   (VIII) and the facets closely approaching one another at the outer edge of the washerlike base and being at an increasing distance from each other as the washerlike base is traversed radially-inward.

References Cited by the Examiner
UNITED STATES PATENTS

| | | | |
|---|---|---|---|
| 2,083,045 | 6/37 | Vaurs | 151—30 |
| 2,284,081 | 5/42 | Beggs | 151—37 |
| 2,775,917 | 1/57 | Ferguson | 85—36 |
| 2,824,480 | 2/58 | Hotchkin | 151—37 |
| 2,945,524 | 7/60 | Becker | 151—38 |
| 3,086,421 | 4/63 | Hamman | 85—32 |

FOREIGN PATENTS 586,689   11/59   Canada.

EDWARD C. ALLEN, *Primary Examiner.*
CARL W. TOMLIN, *Examiner.*